United States Patent
Murren et al.

(10) Patent No.: US 6,827,321 B1
(45) Date of Patent: Dec. 7, 2004

(54) WHEELED TREE STAND APPARATUS

(76) Inventors: Andrew J. Murren, 935 E. 4$^{th}$ Ave., Escondido, CA (US) 92025; Petra A. Murren, 935 E. 4$^{th}$ Ave., Escondido, CA (US) 92025

( * ) Notice: Subject to any disclaimer, the term of this patent is extended or adjusted under 35 U.S.C. 154(b) by 0 days.

(21) Appl. No.: 10/434,632

(22) Filed: May 12, 2003

(51) Int. Cl.$^7$ ............................................. F16M 13/00
(52) U.S. Cl. ....................................................... 248/519
(58) Field of Search .................................. 248/519, 523, 248/346.01

(56) References Cited

U.S. PATENT DOCUMENTS

| | | | |
|---|---|---|---|
| 1,662,091 A | * 3/1928 | Vuozzo | 248/524 |
| 2,671,624 A | 3/1954 | Carney | |
| 3,119,585 A | 1/1964 | Austenson | |
| 5,299,381 A | 4/1994 | Oldenburg, Jr. | |
| 5,362,024 A | 11/1994 | Grinnen | |
| 5,375,294 A | * 12/1994 | Garrett | 16/34 |
| 5,388,799 A | 2/1995 | Keefe | |
| D366,008 S | 1/1996 | Newcomer | |
| 5,743,505 A | * 4/1998 | Sofy | 248/346.01 |
| 5,918,849 A | * 7/1999 | Bliss | 248/523 |
| 5,921,022 A | * 7/1999 | Baker | 47/40.5 |
| 6,129,325 A | * 10/2000 | Niklas | 248/523 |
| 6,367,494 B1 | * 4/2002 | Tung | 135/99 |
| 6,432,003 B1 | * 8/2002 | van Nimwegen | 473/481 |
| 6,554,243 B2 | * 4/2003 | Davis et al. | 248/519 |
| 6,594,856 B1 | * 7/2003 | Cherukuri | 16/34 |
| 6,702,239 B2 | * 3/2004 | Boucher | 248/156 |

* cited by examiner

*Primary Examiner*—Leslie A. Braun
*Assistant Examiner*—A. Joseph Wujciak, III

(57) ABSTRACT

A wheeled tree stand apparatus for allowing the moving of a tree such as a Christmas tree to facilitate the decorating thereof. The wheeled tree stand apparatus includes a cone-shaped base member having top, bottom and side walls, and also having an opening being disposed in the top wall thereof, and further having a tree trunk-receiving bore being disposed therein through the opening; and also includes a wheel assembly being retractably disposed in the cone-shaped base member and including wheel support members, and also including bracket members being attached to the wheel support members, and further including wheel members being pivotally mounted to the bracket members; and further includes a wheel locking assembly including latches being engagable to the wheel support members for locking the wheel members in ground-engagement positions; and also includes a fastening assembly being attached to the cone-shaped base member for fastening about a portion of a tree being supported upon the cone-shaped base member.

6 Claims, 5 Drawing Sheets

WHEELED TREE STAND APPARATUS

BACKGROUND OF THE INVENTION

1. Field of the Invention

The present invention relates to wheeled tree stands and more particularly pertains to a new wheeled tree stand apparatus for allowing the moving of a tree such as a Christmas tree to facilitate the decorating thereof.

2. Description of the Prior Art

The use of wheeled tree stands is known in the prior art. More specifically, wheeled tree stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,299,381; U.S. Pat. No. 5,362,024; U.S. Pat. No. 3,119,585; U.S. Pat. No. 5,388,799; U.S. Pat. No. 2,671,624; and U.S. Patent No. Des. 366,008.

While these devices fulfill their respective, particular objectives and requirements, the aforementioned patents do not disclose a new wheeled tree stand apparatus. The prior art includes stands having legs and also having a cup-like holders being mounted to the legs and further having fasteners for fastening the tree in the cup-like holders.

SUMMARY OF THE INVENTION

The general purpose of the present invention, which will be described subsequently in greater detail, is to provide a new wheeled tree stand apparatus which has many of the advantages of the wheeled tree stands mentioned heretofore and many novel features that result in a new wheeled tree stand apparatus which is not anticipated, rendered obvious, suggested, or even implied by any of the prior art wheeled tree stands, either alone or in any combination thereof. The present invention includes a cone-shaped base member having top, bottom and side walls, and also having an opening being disposed in the top wall thereof, and further having a tree trunk-receiving bore being disposed therein through the opening; and also includes a wheel assembly being retractably disposed in the cone-shaped base member and including wheel support members, and also including bracket members being attached to the wheel support members, and further including wheel members being pivotally mounted to the bracket members; and further includes a wheel locking assembly including latches being engagable to the wheel support members for locking the wheel members in ground-engagement positions; and also includes a fastening assembly being attached to the cone-shaped base member for fastening about a portion of a tree being supported upon the cone-shaped base member. None of the prior art includes the combination of elements of the present invention.

There has thus been outlined, rather broadly, the more important features of the wheeled tree stand apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new wheeled tree stand apparatus which has many of the advantages of the wheeled tree stands mentioned heretofore and many novel features that result in a new wheeled tree stand apparatus which is not anticipated, rendered obvious, suggested, or even implied by any of the prior art wheeled tree stands, either alone or in any combination thereof.

Still another object of the present invention is to provide a new wheeled tree stand apparatus for allowing the moving of a tree such as a Christmas tree to facilitate the decorating thereof.

Still yet another object of the present invention is to provide a new wheeled tree stand apparatus that is easy and convenient to set up and use.

Even still another object of the present invention is to provide a new wheeled tree stand apparatus that allows easy positioning of a Christmas tree in whatever selected room.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
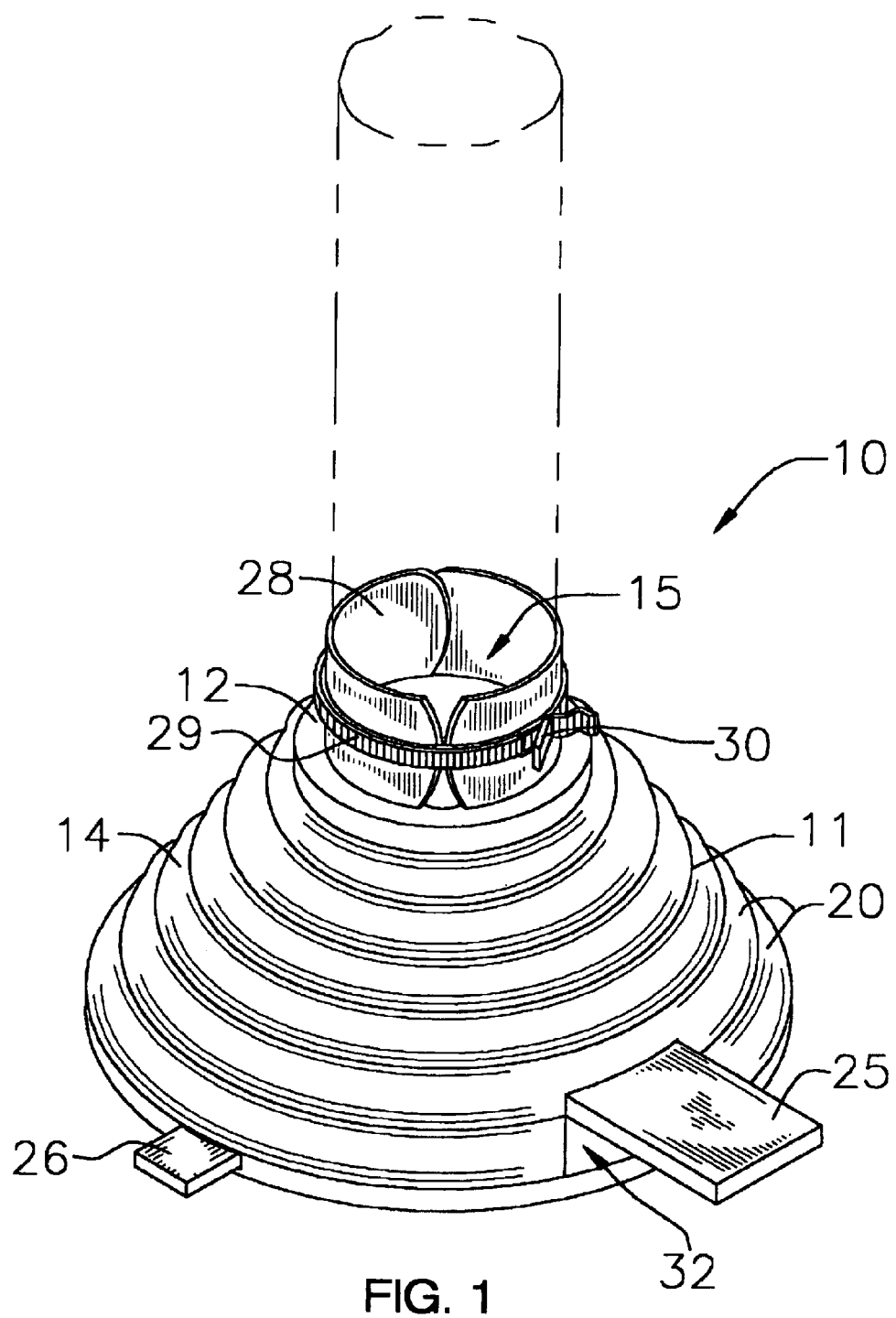
FIG. 1 is a perspective view of a new wheeled tree stand apparatus according to the present invention.
Figure 2:
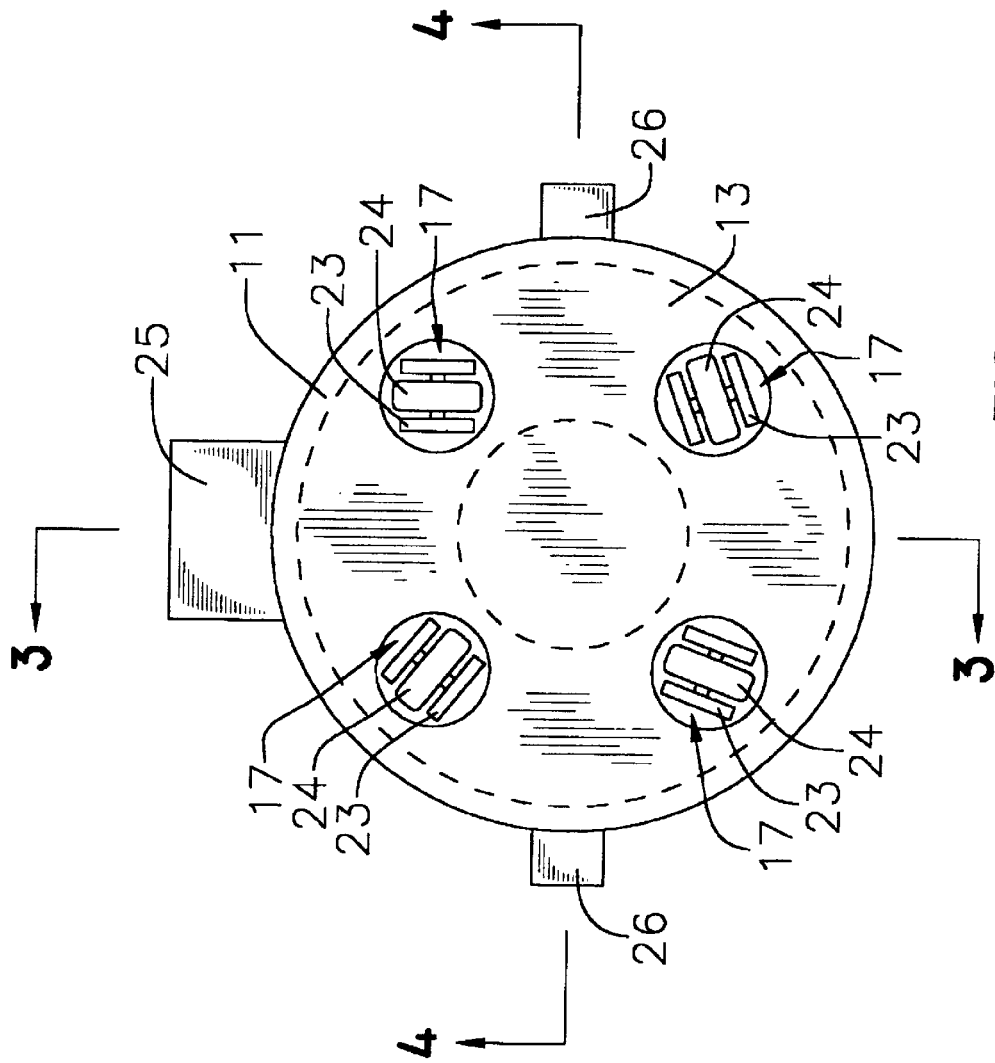
FIG. 2 is a bottom plan view of the present invention.
Figure 3:
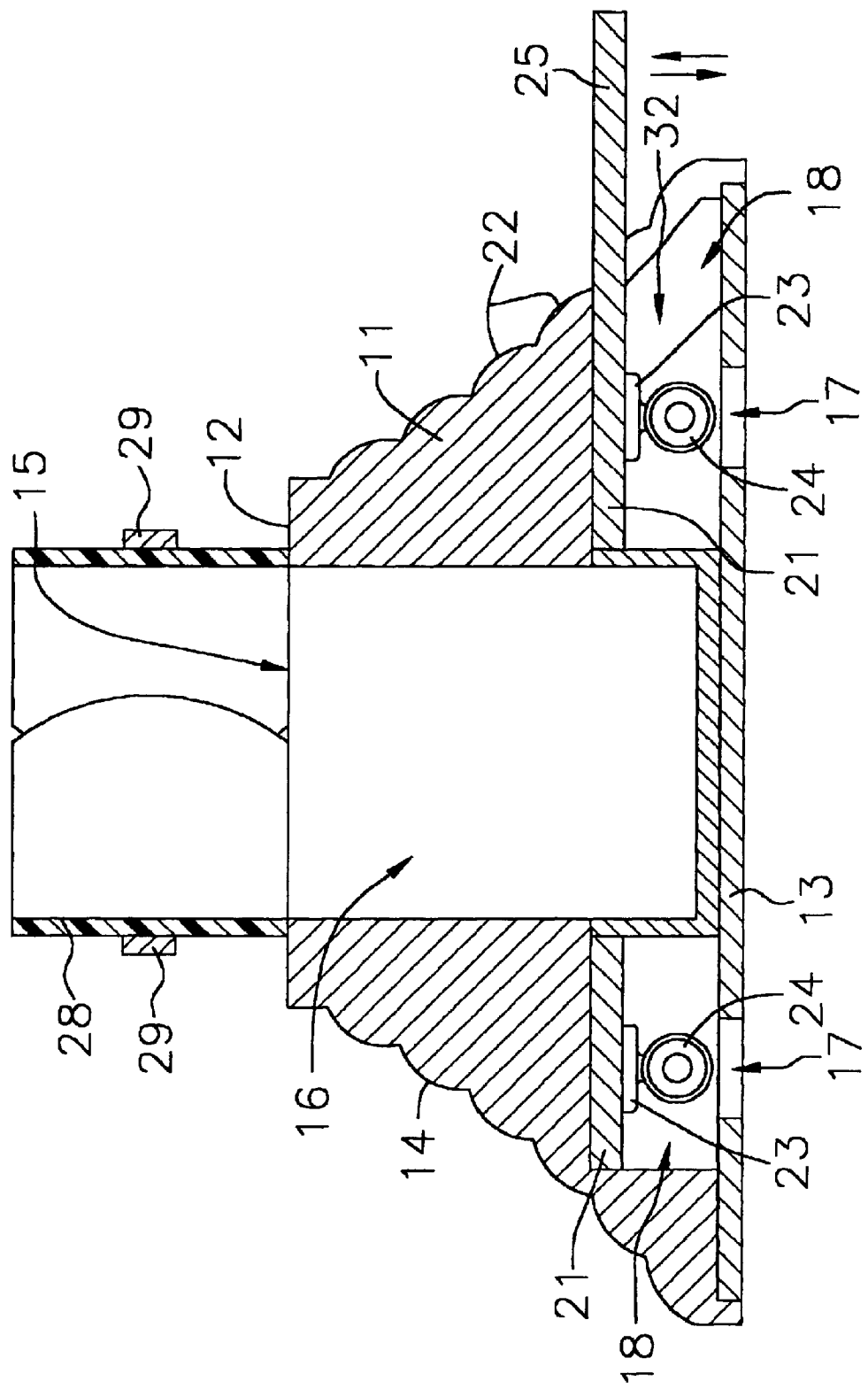
FIG. 3 is a cross-sectional view of the present invention.
Figure 4:
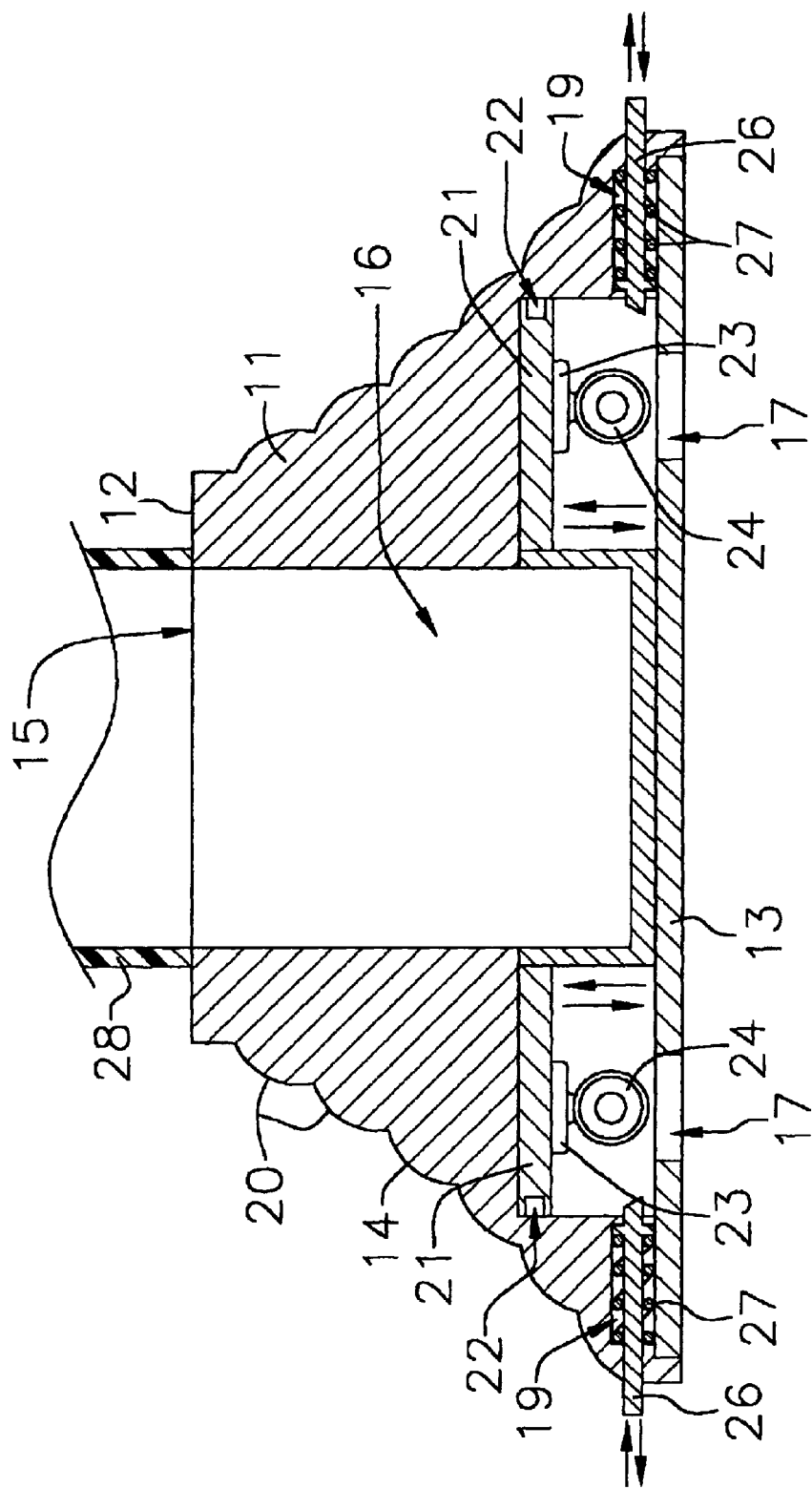
FIG. 4 is another cross-sectional view of the present invention.
Figure 5:
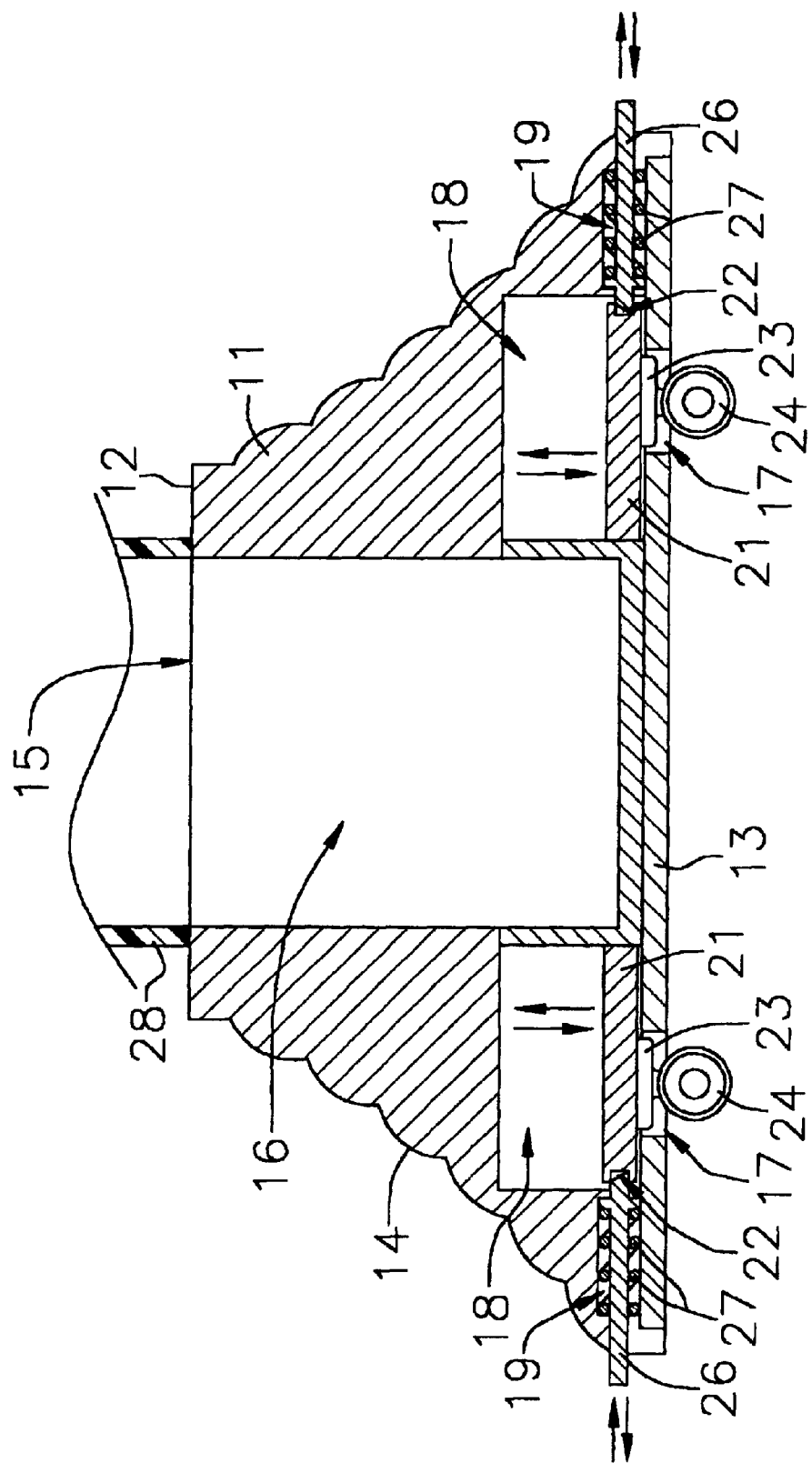
FIG. 5 is yet another cross-sectional view of the present invention.

With reference now to the drawings, and in particular to FIGS. 1 through 5 thereof, a new wheeled tree stand apparatus embodying the principles and concepts of the present invention and generally designated by the reference numeral 10 will be described.

As best illustrated in FIGS. 1 through 5, the wheeled tree stand apparatus 10 generally comprises a cone-shaped base member 11 having top, bottom and side walls 12–14, and also having an opening 15 being disposed in the top wall 12 thereof, and further having a tree trunk-receiving bore 16 being disposed therein through the opening 15. The cone-shaped base member 11 also includes a plurality of cavities 18 being disposed therein above the bottom wall 13, and further includes a plurality of openings 17 being disposed through the bottom wall 13 and into the cavities 18. The cone-shaped base member 11 also includes bores 19 and a hole 32 being disposed through the side wall 14 of the cone-shaped base member 11 and into the cavities 18. The side wall 14 comprises a plurality of annular bumps 22 being disposed side-by-side.

A wheel assembly is retractably and conventionally disposed in the cone-shaped base member 11 and includes wheel support members 21, and also includes bracket members 23 being conventionally attached to the wheel support members 21, and further includes wheel members 24 being conventionally mounted to the bracket members 23. The wheel support members 21 are board-like members being movably disposed in the cavities 18 with each of the board-like members 21 having an longitudinal slot 22 being disposed in and extending a length of a longitudinal edge thereof with a pair of the bracket members 23 being securely and conventionally attached to a bottom side thereof. The wheel assembly also includes a foot pedal 25 being conventionally attached to the wheel support members 21 and being disposed through the hole 32 in the side wall 14 of the cone-shaped base member 11 for retracting the wheel members 24 into the cavities 18 of the cone-shaped base member 11.

A wheel locking assembly includes latches 26 being engagable to the wheel support members 21 for locking the wheel members 24 in ground-engagement positions. The latches 26 are tongues being slidably disposed through the bores 19 of the side wall 14 of the cone-shaped base member 11 and being biasedly received in the longitudinal slots 22 of the wheel support members 21 to lock the wheel members 24 in ground-engagement positions. The wheel locking assembly further includes springs 27 being conventionally disposed about the latches 26 in the bores 19 of the side wall 14 of the cone-shaped base member 11 for biasing end portions of the latches 26 into the cavities 19 of the cone-shaped base member 11.

A fastening assembly is conventionally attached to the cone-shaped base member 11 for fastening about a portion of a tree being supported upon the cone-shaped base member 11. The fastening assembly includes a flexible collar member 28 being conventionally attached along a longitudinal edge thereof upon the top wall 12 of the cone-shaped base member 11 and along an edge of the opening 15 through the top wall 12 of the cone-shaped base member 11, and also includes a strap 29 being conventionally attached about the flexible collar member 28, and further includes a ratcheting mechanism 30 being conventionally attached to the strap 29 for tightening the flexible collar member 28 and the strap 29 about a portion of the tree trunk to secure the tree upon the cone-shaped base member 11.

In use, the flexible collar member 28 and the strap 29 are loosened, and a trunk portion of a tree is extended through the opening 15 of the top wall 12 and into the bore 16, and the flexible collar member 28 and the strap 29 are tightened and fastened about the tree to secure the tree upon the cone-shaped base member 11. The user can move the cone-shaped base member 11 as desired by pressing down on the foot pedal 25 which presses down on the wheel support members 21 with the wheel members 24 being deployed under the bottom wall 13 of the cone-shaped base member 11 and with the latches 26 being biasedly received in the longitudinal slots 22 of the wheel support members 21 to secure the wheel members 24 in ground-engagement positions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the wheeled tree stand apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wheeled tree stand apparatus comprising:
   a cone-shaped base member having top, bottom and side walls, and also having an opening being disposed in said top wall thereof, and further having a tree trunk-receiving bore being disposed therein through said opening, said cone-shaped base member also including a plurality of cavities being disposed therein above said bottom wall, and further including a plurality of openings being disposed through said bottom wall and into said cavities, said cone-shaped base member also including bores and a hole being disposed through said side wall of said cone-shaped base member and into said cavities;
   a wheel assembly being retractable disposed in said cone-shaped base member and including wheel support members, and also including bracket members being attached to said wheel support members, and further including wheel members being pivotally mounted to said bracket members;
   a wheel locking assembly including latches being engagable to said wheel support members for locking said wheel members in ground-engagement positions; and
   a fastening assembly being attached to said cone-shaped base member for fastening about a portion of a tree being supported upon said cone-shaped base member.

2. The wheeled tree stand apparatus as described in claim 1, wherein said side wall includes a plurality of annular bumps being disposed side-by-side.

3. The wheeled tree stand apparatus as described in claim 1, wherein said wheel support members are board members being movably disposed in said cavities, each of said board members having a longitudinal slot being disposed in and extending a length of a longitudinal edge thereof with a pair of said bracket members being securely attached to a bottom side thereof.

4. The wheeled tree stand apparatus as described in claim 3, wherein said wheel assembly also includes a foot pedal being attached to said wheel support members and being disposed through said hole of said side wall of said cone-shaped base member for retracting said wheel members into said cavities of said cone-shaped base member.

5. The wheeled tree stand apparatus as described in claim 4, wherein said latches are tongues being slidably disposed through said bores of said side wall of said cone-shaped base member and being biasedly received in said elongate slots of said wheel support members to lock said wheel members in ground-engagement positions.

6. The wheeled tree stand apparatus as described in claim 5, wherein said wheel locking assembly further includes springs being disposed about said latches in said bores of said side wall of said cone-shaped base member for biasing end portions of said latches into said cavities of said cone-shaped base member.

* * * * *